US008458093B1

(12) United States Patent  (10) Patent No.: US 8,458,093 B1
Smith                    (45) Date of Patent:    Jun. 4, 2013

(54) SYSTEMS AND METHODS OF TRANSFERRING CREDIT CARD CHARGE TO LINE OF CREDIT

(75) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 830 days.

(21) Appl. No.: 12/488,067

(22) Filed: Jun. 19, 2009

(51) Int. Cl.
*G06Q 40/00* (2012.01)

(52) U.S. Cl.
USPC .......... 705/44; 705/35; 705/39; 705/38; 705/37; 705/42; 709/213; 382/137; 235/379; 715/200

(58) Field of Classification Search
CPC ..................................... G06Q 20/04
USPC ............ 705/44, 35, 39, 37, 38; 382/137; 235/379; 715/200; 709/213
See application file for complete search history.

(56) References Cited

U.S. PATENT DOCUMENTS

| | | | | |
|---|---|---|---|---|
| 5,875,437 | A * | 2/1999 | Atkins | 705/40 |
| 6,324,524 | B1 * | 11/2001 | Lent et al. | 705/38 |
| 7,321,875 | B2 * | 1/2008 | Dilip et al. | 705/37 |
| 7,401,731 | B1 | 7/2008 | Pletz et al. | |
| 7,783,566 | B2 * | 8/2010 | Armes et al. | 705/40 |
| 8,010,422 | B1 * | 8/2011 | Lascelles et al. | 705/35 |
| 8,224,723 | B2 * | 7/2012 | Bosch et al. | 705/35 |
| 8,271,392 | B2 * | 9/2012 | Tomchek et al. | 705/64 |
| 2004/0049452 | A1 | 3/2004 | Blagg | |
| 2006/0224480 | A1 | 10/2006 | Bent et al. | |
| 2007/0027799 | A1 | 2/2007 | Manelis et al. | |
| 2007/0106584 | A1 * | 5/2007 | Irwin | 705/35 |
| 2009/0119202 | A1 * | 5/2009 | Dumas-Brown et al. | 705/38 |

OTHER PUBLICATIONS

Overdraft Protection Programs: A Look at Truth in Savings and Reg E; Credit Union Newswatch pp. 2-3; Feb. 23, 2009.*
Leading-Edge Lenders; Bankston, Karen; Credit Union Magazine v75n1 pp. 36-40; Jan. 2009.*
"Fidelity Information Services and First Data Announce Agreement to Deliver Credit Card-Enabled HELOC Solution", Fidelity National Financial, Jun. 15, 2005.
Zywicki, Todd J.: "The Economics of Credit Cards", pp. 1-125.

* cited by examiner

*Primary Examiner* — Tien Nguyen
(74) *Attorney, Agent, or Firm* — Perkins Coie LLP

(57) ABSTRACT

After a charge has been made with a credit card, the charge may be analyzed to determine if it may be transferred to a line of credit. The credit card may be monitored for purchases that match rules or criteria set by a user and/or an institution system. If the transaction meets the rules and/or criteria, the charge on the credit card may be paid with funds from the line of credit. In an implementation, instead of the user waiting for the credit card bill and then paying the amount of the charge on the bill from the line of credit, the institution system automatically performs the transfer for the user (e.g., pays the charge on the credit card with funds from the line of credit).

11 Claims, 6 Drawing Sheets

SYSTEMS AND METHODS OF TRANSFERRING CREDIT CARD CHARGE TO LINE OF CREDIT

BACKGROUND

A credit card is a system of payment in which money is not removed from the user's account after every transaction. The issuer lends money to the user to be paid to the merchant. The balance does not have to be paid in full each month. A credit card allows the user to revolve the balance, at the cost of having interest charged.

A line of credit is any credit facility extended to a user, such as a person or a business, by a bank or financial institution. It is like an account that can readily be tapped into if the need arises or not touched at all and saved for emergencies. A line of credit may be secured by collateral. Such a line of credit is referred to as an equity line of credit. For example, a home equity line of credit (often called HELOC) is a loan in which the lender agrees to lend a maximum amount within an agreed period (called a term), where the collateral is the user's equity in his house.

With a line of credit, the user is not advanced the entire sum up front, but uses a line of credit to borrow sums that total no more than the credit limit, similar to a credit card. Interest is only paid on the money actually taken out. The interest rate on a line of credit is typically lower than the interest rate on a credit card.

SUMMARY

After a charge has been made with a credit card, the charge may be analyzed to determine if it may be transferred to a line of credit. The credit card may be monitored for purchases that match rules or criteria set by a user and/or an institution system. If the transaction meets the rules and/or criteria, the charge on the credit card may be paid with funds from the line of credit. In an implementation, instead of the user waiting for the credit card bill and then paying the amount of the charge on the bill from the line of credit, the institution system automatically performs the transfer for the user (e.g., pays the charge on the credit card with funds from the line of credit).

In an implementation, if the charge on the credit card meets one or more predetermined rules, such as the amount of the charge, the merchant where the charge was made, or the item purchased, and if the user has a line of credit, the charge may be transferred to the line of credit from the credit card. The user may provide authorization for the transfer before and/or after the charge is made on the credit card, depending on the implementation.

In an implementation, if the user does not have a line of credit, the institution system may determine if the user is eligible for the line of credit and, if so, offer the line of credit to the user pursuant to a charge being made on the credit card, where the charge is eligible to be transferred to the line of credit (e.g., pursuant to previously established rules and/or criteria).

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
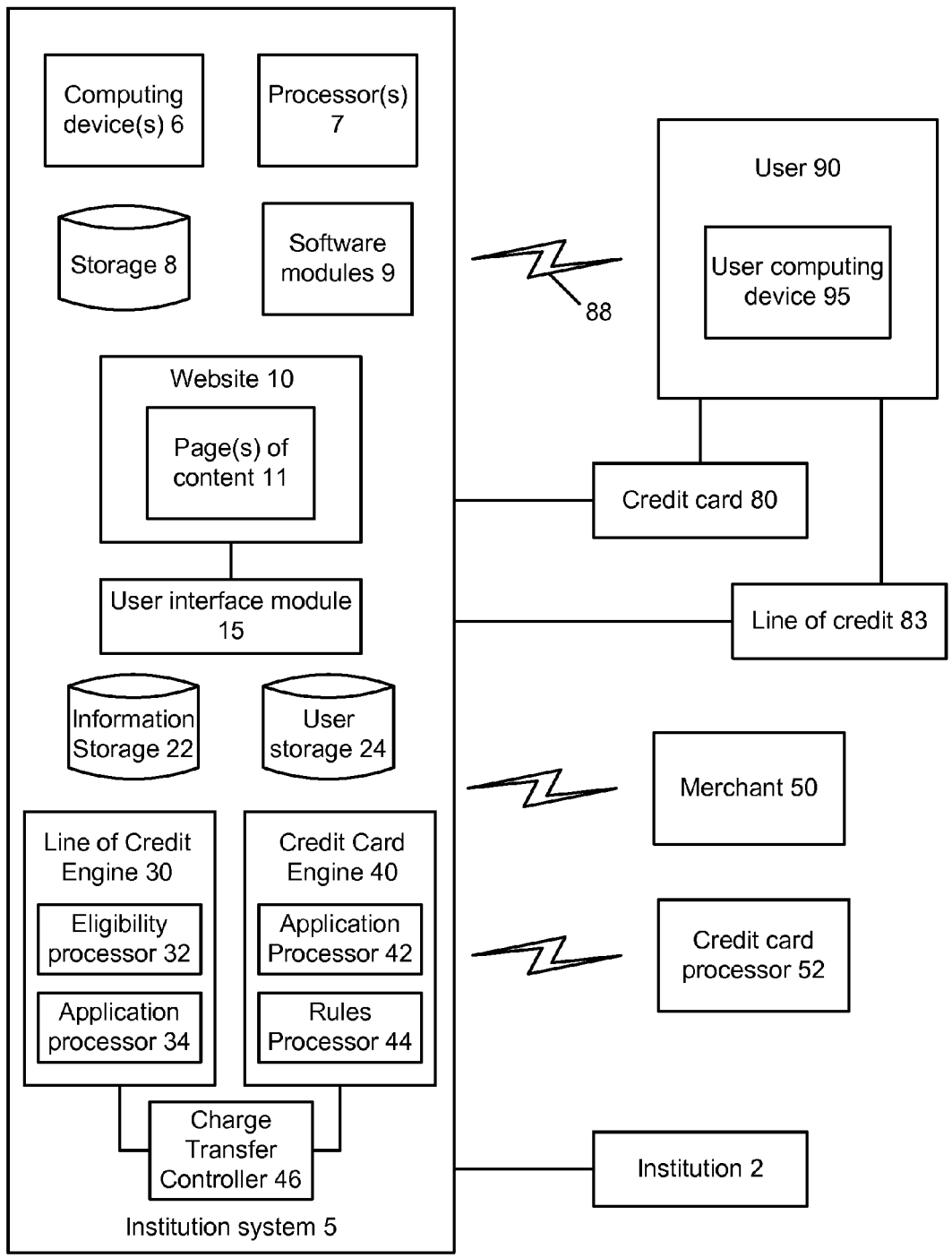
FIG. 1 is a block diagram of an implementation of a system that may be used to transfer a credit card charge to a line of credit.

FIG. 1 is a block diagram of an implementation of a system that may be used to transfer a credit card charge to a line of credit. An institution system 5, associated with or otherwise maintained by an institution 2 such as a financial services institution, lending institution or bank for example, may include a line of credit engine 30 and a credit card engine 40. The line of credit engine 30 may issue and maintain a line of credit 83 for a user 90, and the credit card engine 40 may issue a credit card 80 and maintain a credit card 80 account for the user 90, as described further herein. The user 90 may be an individual or other entity who owns an account, such as a line of credit 93 or a credit card 80 account that may be held by the institution system 5 or at the institution 2.

The user 90 may provide data to the institution system 5 via a user computing device 95. The user computing device 95 may be any type of personal computer (PC), a handheld computing device, a personal digital assistant (PDA), a mobile phone, a smartphone, or any other mobile device, for example. An example user computing device is described with respect to FIG. 6.

The user computing device 95 and the institution system 5 may be connected over a communications network 88. The user 90 may communicate with the institution system 5 by way of the communications network 88 such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 90 may also communicate with the institution system 5 by phone, email, instant messaging, text messaging, web chat, facsimile, mail, and the like.

The line of credit engine 30 may comprise an eligibility processor 32 that may determine if the user 90 is eligible for a line of credit 83, as described further herein. The line of credit 83 may be any type of line of credit, including an equity line of credit (e.g., a home equity line of credit, a vehicle equity line of credit, etc.). The equity line of credit may use any property of the user 90 as collateral, such as a house, a vehicle, a boat, an airplane, or an item purchased with the credit card 80. The line of credit engine 30 may also comprise an application processor 34 that may process an application from the user 90 for the line of credit 83 and may issue the line of credit 83 to the user 90.

The credit card engine 40 may comprise an application processor 42 that may process an application for the credit card 80 from the user 90 and may issue the credit card 80 to the user 90. The credit card engine 40 may also comprise a rules processor 44 that may set and/or store rules regarding when a charge made on the credit card 80 may be transferred to the line of credit 83, as described further herein. A charge transfer controller 46 may transfer a charge made on the credit card 80 to the line of credit 83, e.g., by paying the charge on the credit card 80 with funds from the line of credit 83, pursuant to instructions provided by the credit card engine 40.

The user 90 may purchase an item at a merchant 50 with the credit card 80 and the transaction may be processed by a credit card processor 52. The credit card processor 52 may be an entity that provides services pertaining to credit aspects and behaviors of credit cards. The credit card processor 52 may be in communication with the institution system 5 via a network, such as the communications network 88. It is contemplated that the institution system 5 may handle such credit aspects and/or behaviors of credit cards, and that the credit card processor 52 may not be used.

After the charge has been made with the credit card 80, the charge may be analyzed to determine if it may be transferred to the line of credit 83. The credit card 80 may be monitored for purchases that match rules or criteria set by the user 90 and/or the institution system 5. If the transaction meets the rules and/or criteria, the charge on the credit card 80 may be paid with funds from the line of credit 83. In an implementation, instead of the user 90 waiting for the credit card 80 bill and then paying the amount of the charge on the bill from the line of credit 83, the institution system 5 automatically performs the transfer for the user 90 (e.g., pays the charge on the credit card 80 with funds from the line of credit 83, as described further herein).

Figure 2:
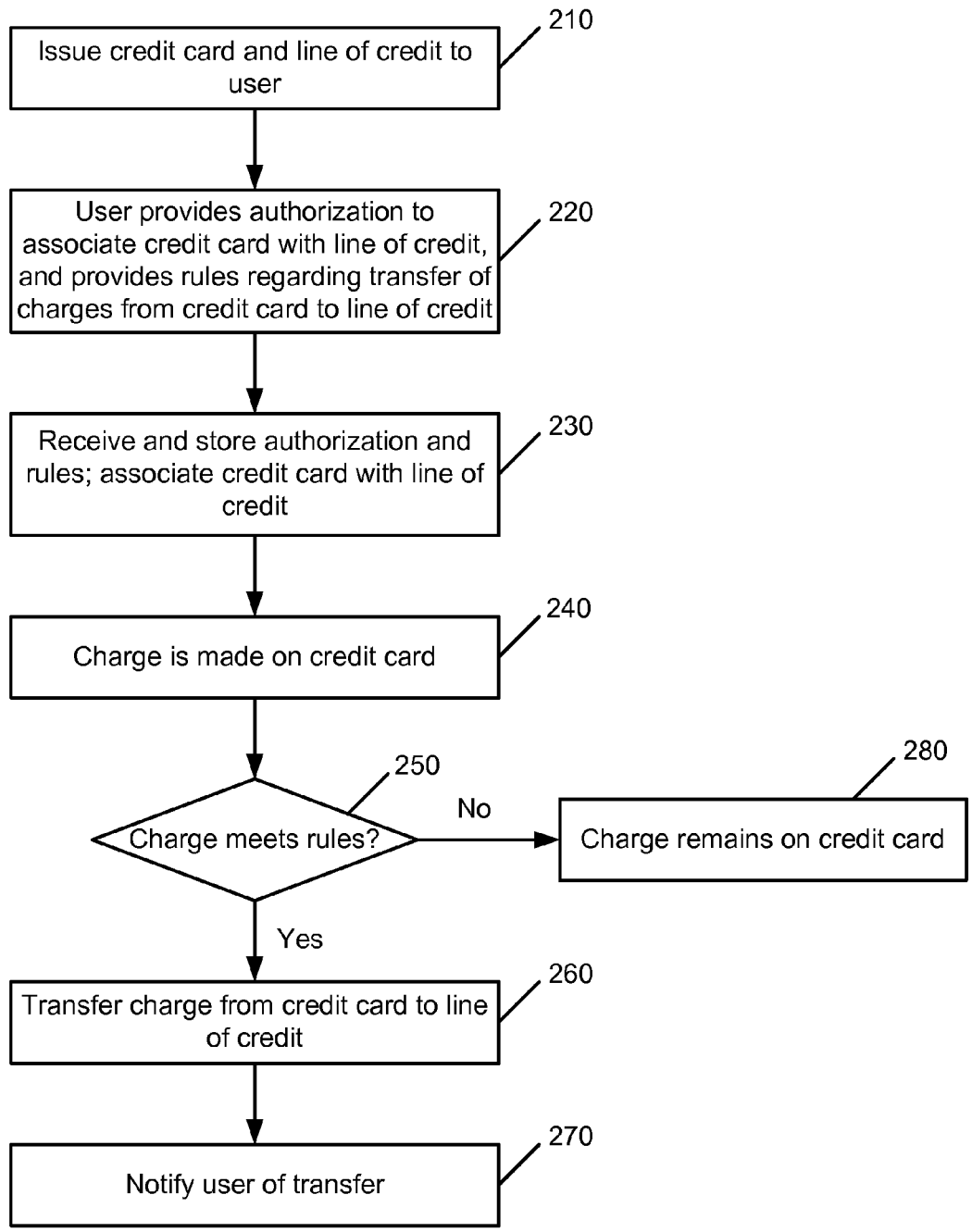
FIG. 2 is an operational flow of an implementation of a method that may be used to transfer a credit card charge to a line of credit.

In some implementations, described further with respect to FIGS. 2 and/or 3 for example, if the charge on the credit card 80 meets one or more predetermined rules, such as the amount of the charge (e.g., "if the charge is for at least a $X, then transfer the charge" where X is an amount set by the user 90 or the institution system 5), the merchant where the charge was made (e.g., based on one or more merchant identifiers such as merchant category codes (MCCs), standard industrial classifications (SICs), and or North American Industry Classification System (NAICS) codes, for example) (e.g., "if the merchant is a jewelry dealer or an automobile dealer, then transfer the charge"), or the item purchased (e.g., "if the item purchased is a computer, a television, or a motorcycle, then transfer the charge"), and if the user has a line of credit 83, the charge may be automatically transferred to the line of credit 83 from the credit card 80. The user 90 may provide authorization for the transfer before and/or after the charge is made on the credit card 80, depending on the implementation.

The user 90 and/or the institution system 5 may set the rules or other criteria that may be used in determining whether or not to transfer a charge from the credit card 80 to the line of credit 83, to offer such a transfer to the user 90, and/or to offer the line of credit 83 to the user 90 if the user does not already have the line of credit 83. For example, when a charge on the credit card 80 exceeds a predetermined amount, the charge may be automatically paid from the line of credit 83 that has been previously established. In this manner, the user 90 may receive a better interest rate using the line of credit 83 instead of the credit card 80 and may get an interest tax deduction using the line of credit 83.

In an implementation, any purchase amount of a charge on the credit card 80 may be transferred to the line of credit 83. In another implementation, only charges directed to particular items may be transferred to the line of credit 83. The institution system 5 may determine the item made with respect to a particular charge by asking the user 90, the merchant 50, and/or the credit card processor 52 for details about the transaction, for example. The institution system 5 may compare the item(s) purchased with the credit card 80 to a predetermined list of items that may be stored in storage, such as information storage 22, user storage 24, or the storage 8, described further herein. The predetermined list of items may be populated with data provided by the user 90 and/or the institution system 5 and/or the institution 2, for example.

Figure 4:
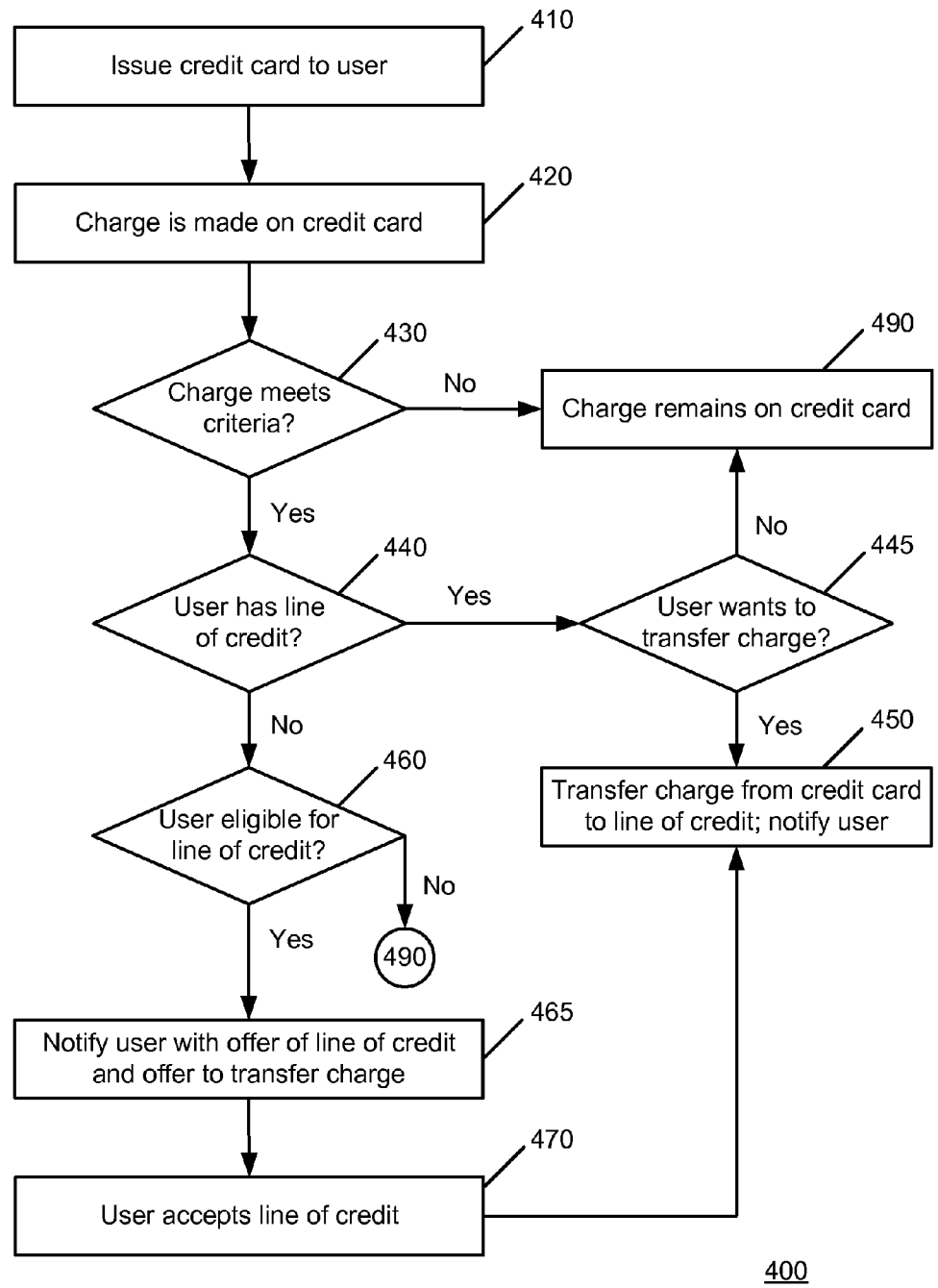
FIG. 4 is an operational flow of another implementation of a method that may be used to transfer a credit card charge to a line of credit.

In some implementations, described further with respect to FIGS. 4 and/or 5, for example, if the user 90 does not have the line of credit 83, the institution system 5 may determine if the user 90 is eligible for the line of credit 83 and, if so, offer the line of credit 83 to the user 90 pursuant to a charge being made on the credit card 80, where the charge is eligible to be transferred to the line of credit 83 (e.g., pursuant to previously established rules and/or criteria).

In an implementation, the charge may only be transferred from the credit card 80 to the line of credit 83 if the difference between the line of credit interest rate and the credit card interest rate is greater than a predetermined amount. The predetermined amount may be set by the user 90, the institution 2, or the institution system 5, depending on the implementation.

The application processor 34 of the line of credit engine 30 and the application processor 42 of the credit card engine 40 may each request and receive information from the user 90 via a line of credit application and a credit card application, respectively, that the user 90 may fill out and provide to the institution system 5. The user 90 may fill out the application(s) using the user computing device 95 and electronically send the application(s) to the institution system 5, such as via a website, email, or facsimile, for example. Alternatively, the user 90 may send the application(s) to the institution system 5 by mail or any other delivery method. The application processor 34 and/or the application processor 42 may retrieve information from storage, such as information storage 22 and user storage 24, and use the information in processing the request(s) for the line of credit 83 and/or the credit card 80. The application processor 34 and/or the application processor 42 may also store information pertaining to the user 90 and the application(s) in storage, such as information storage 22 and user storage 24.

The application processor 34 and/or the application processor 42 may send the application information (e.g., over the network 88) to one or more credit reporting bureaus (e.g., Equifax, Experian, TransUnion, etc.) to obtain a report of the user's credit history. The credit history report may be obtained in real time in order to expedite processing of the application(s). A determination may then be made by the institution system 5 as to whether the user 90 qualifies for the line of credit 83 and/or the credit card 80 based, for example, on their credit history and the institution's internal policies. The user 90 may be notified by the institution system 5 of a decision on the request(s) for the credit card 80 and/or the line of credit 83 via the user computing device 95.

Information storage 22 may contain information pertaining to accounts or products offered by the institution system 5, as well as rules and other criteria for transferring charges from credit cards to lines of credit and/or opening or offering lines of credit pursuant to charges made on credit cards, for example. Information storage 22 may include data that may be used in the generation of a credit card application and/or line of credit application, the decision of a user's qualification for the credit card 80 or the line of credit 83, and the maintenance of the credit card 80 and the line of credit 83.

User storage 24 may contain information directed to users, such as name, address, account information, products owned, contact information for authorizing a transfer of a charge from the credit card 80 to the line of credit 83, rules provided by the user 90 directed to transferring a charge from the credit card 80 to the line of credit 83, etc., for example.

Information directed to credit cards, lines of credit, transfers of charges from the credit card 80 to the line of credit 83, rules, criteria, etc. may be provided via a website 10 to the user computing device 95 associated with a user 90. In an implementation, instead of hosting the website 10, the institution system 5 may comprise a conventional application server hosting a proprietary online service accessible only by a private network. In any event, the institution system 5 may have appropriate security mechanisms in place to prevent unauthorized third parties from intercepting the user's information.

In an implementation, a user interface module 15 may receive content from the line of credit engine 30 and/or the credit card engine 40 and may format one or more pages of content 11 as a unified graphical presentation that may be provided to the user computing device 95. The page(s) of content 11 may be directed to credit card information, line of credit information, and/or transfer information, and may be provided to the user computing device 95 via the website 10 associated with the institution system 5.

When the user 90 accesses the website 10, using a web browser on the user computing device 95, they may be presented with credit card and/or line of credit information such as balances, interest rates, rules, etc., via the page(s) of content 11. The information may be displayed on one or more web pages, for example. The user 90 may enter information into the web pages via a web browser on the user computing device 95.

The content may be personalized to the user 90, using information retrieved from the user storage 24, for example. Personalization may include presentation of the page(s) of content 11 and/or functionality of the page(s) of content 11. For example, a graphical representation displayed on the page(s) of content 11 may be pre-filled with some information pertaining to the user, such as name, address, account number, etc.

A user access system may be implemented as a web server in an implementation. The user access system, through the use of any suitable interactive web technology, provides an interactive experience to the user 90 through which access to and maintenance of the credit card 80, the line of credit 83, and rules regarding the transfer of charges from the credit card 80 to the line of credit 83 can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 5 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process transactions involving the credit card 80 or the line of equity 83, and may provide account information and access to the user 90.

The institution system 5 may comprise one or more computing devices 6. The user computing device 95 may allow the user 90 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user, products, and/or services, may be stored in storage 8 or other storage, for example.

Example software modules may include modules for sending and receiving information between the institution system 5 and the user 90 as well as between the institution system 5 and the merchant 50 and the credit card processor 52, requesting and retrieving information from storage 8, information storage 22, and user storage 24, processing credit card and line of credit requests, rules, and transfer requests received from the user 90, processing transfers, and generating web pages, described further herein. While specific functionality is described herein as occurring with respect to specific modules, the functionality may likewise be performed by more, fewer, or other modules. An example computing device and its components are described in more detail with respect to FIG. 6.

FIG. 2 is an operational flow of an implementation of a method 200 that may be used to transfer a credit card charge to a line of credit. At 210, a user may be issued a credit card and a line of credit from an institution. For example, the user may be the user 90, the credit card may be the credit card 80, the line of credit may be the line of credit 83, and the institution may be the institution 2, described above with respect to FIG. 1. The line of credit may be an equity line of credit, such as a home equity line of credit or any other equity line of credit, for example. The credit card 80 may be issued pursuant to a credit card application that may be submitted by the user 80 and processed by the institution system 5, such as the application processor 42. Similarly, the line of credit 83 may be issued pursuant to a line of credit application that may be submitted by the user 80 and processed by the institution system 5, such as the application processor 34.

At 220, the user 90 may authorize the institution 2, or a system associated with the institution 2 such as the institution system 5, to associate the credit card 80 with the line of credit 83 and to transfer future charges made to the credit card 80 to the line of credit 83. Authorization may be provided from the user 90 using any electronic or physical technique(s), such as via email, instant message, text message, a website, web chat, phone, facsimile, mail, and the like.

In an implementation, the user 90 may set rules regarding which charges to the credit card 80 are to be transferred to the line of credit 83. The rules may be directed to the amount of the charge, the date of the charge, the merchant associated with the charge, the item(s) purchased with the charge, etc. Only those charges that meet the rules (e.g., meet a certain predetermined minimum amount, are made during a certain date or time period, are made at a certain merchant or certain type of merchant, are made for purchase of a certain item or type of item, etc.) may be transferred to the line of credit 83. The rules may be set via a website, such as the website 10, or by any other technique(s), such as email, instant message, text message, web chat, phone, facsimile, mail, and the like.

At 230, the institution system 5 may receive the authorization and any rules, and may store the authorization and rules in storage, such as in a database record associated with the user 90, the credit card 80, or the line of credit 83, for example. The credit card 80 may be associated with the line of credit 83.

At 240, a charge may be made on the credit card 80. At 250, the institution system 5 may determine if the charge on the credit card 80 meets the rules. If so, at 260, the charge is automatically transferred to the line of credit 83. In an implementation, the line of credit 83 is used to pay the charge on the credit card 80; i.e., funds from the line of credit 83 are transferred to the credit card 80 account to pay the charge on the credit card 80. At 270, the user may be notified of the transfer. For example, if a charge to the credit card 80 exceeds a predetermined amount (e.g., $200, $500, $2000, etc.), the charge is transferred to the line of credit 83. As another example, if the charge is for a merchant on a list of MCCs provided by the user 90, then the charge is transferred to the line of credit 83.

If the charge does not meet the rules as determined at 250, then the charge remains on the credit card 80 at 280 and there is no transfer of funds from the line of credit 83 to the credit card 80 account.

Figure 3:
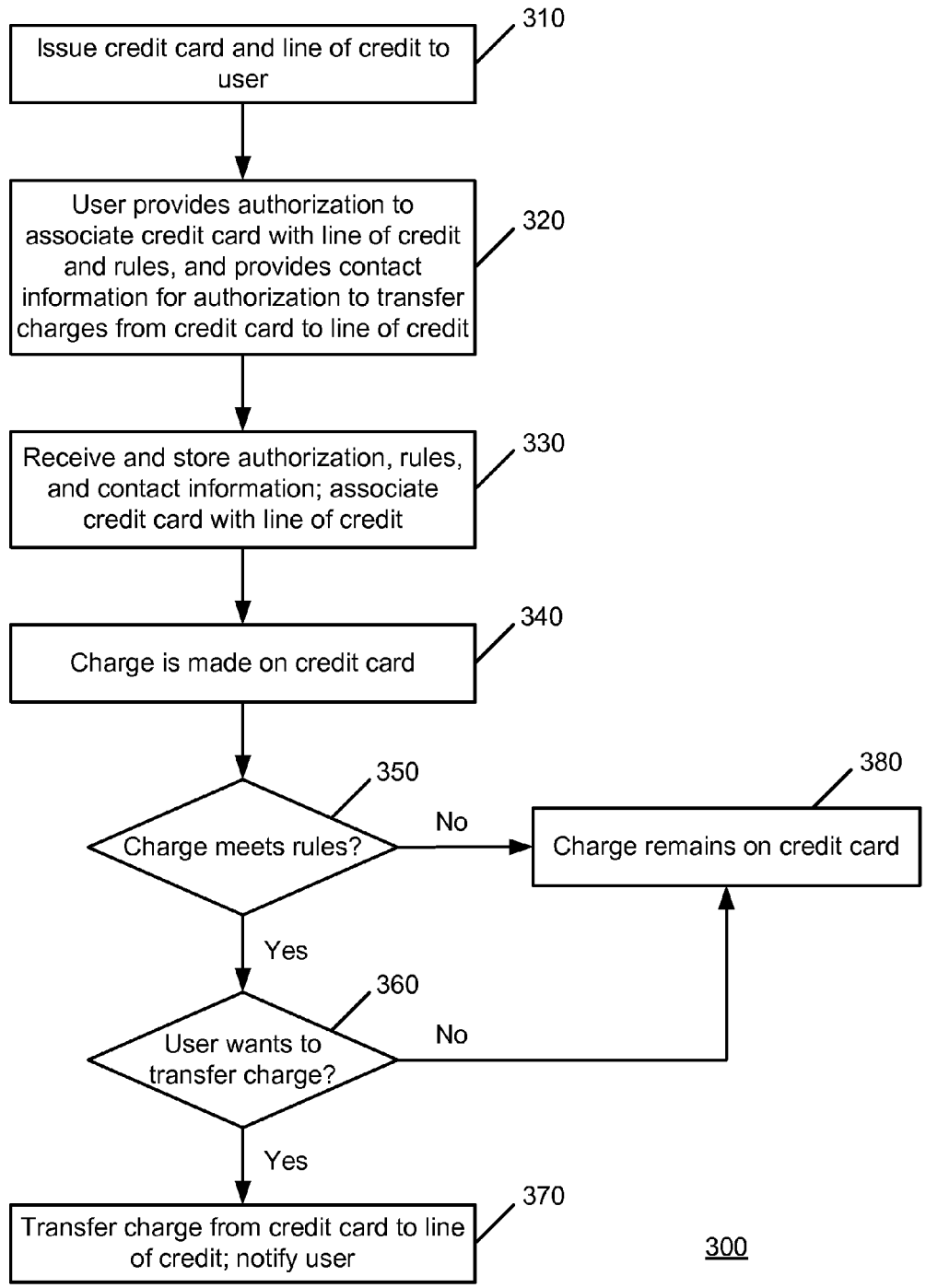
FIG. 3 is an operational flow of another implementation of a method that may be used to transfer a credit card charge to a line of credit.

FIG. 3 is an operational flow of another implementation of a method 300 that may be used to transfer a credit card charge to a line of credit. At 310, a user (e.g., the user 90) may be issued a credit card and a line of credit (e.g., the credit card 80 and the line of credit 83) from an institution (e.g., the institution 2). As noted above, the line of credit 83 may be an equity line of credit, such as a home equity line of credit, a vehicle equity line of credit, and the like.

At 320, the user 90 may authorize the institution 2, or a system associated with the institution such as the institution system 5, to associate the credit card 80 with the line of credit 83. The user 90 may also provide contact information regarding how the user 90 may be contacted, after a charge has been made to the credit card 80, to authorize a transfer of the charge made to the credit card 80 to the line of credit 83. In an implementation, the user 90 may set rules regarding which charges to the credit card 80 they are to be notified about regarding whether or not the charges are to be transferred to the line of credit 83. The rules may be directed to an amount of the charge, the date of the charge, the merchant associated with the charge, the item(s) purchased with the charge, etc. Examples of such rules are further described with respect to FIGS. 1 and 2, for example.

At 330, the institution system 5 may receive the authorization, contact information and any rules, and may store the authorization, contact information, and rules in storage, such as in a database record associated with the user 90, the credit card 80, or the line of credit 83. The credit card 80 may be associated with the line of credit 83.

At 340, a charge may be made on the credit card 80. At 350, the institution system 5 may determine if the charge meets the rules. If the charge does not meet the rules, then the charge remains on the credit card 80 at 380 and there is no transfer of funds from the line of credit 83 to the credit card 80 account.

If the charge meets the rules, at 360, the user 90 may be notified and asked if they would like the charge transferred to the line of credit 83. The notification may be performed using the contact information previously provided by the user 90 and/or contact information retrieved from storage of the institution system 5. Notification may be provided to the user 90 using any electronic or physical technique(s), such as via email, instant message, text message, a website, web chat, phone, facsimile, mail, and the like.

If the user 90 would like to transfer the charge (e.g., in response to the notification), the charge is transferred to the line of credit 83 at 370 and the user 90 may be notified. If not, the charge remains on the credit card 80 at 380.

In an implementation, if the user 90 does not have a balance on the credit card 80, or has not had a balance for a predetermined amount of time (e.g., 2 months, 6 months, 1 year, etc.), the charge may remain on the credit card 80 and the user 90 may not be notified. In an implementation, a balance is checked on the credit card 80 by the institution system 5, and only if the credit card 80 has a balance, then the charge is transferred from the credit card 80 to the line of credit 83.

FIG. 4 is an operational flow of another implementation of a method 400 that may be used to transfer a credit card charge to a line of credit. At 410, a user (e.g., the user 90) may be issued a credit card (e.g., the credit card 80) from an institution (e.g., the institution 2). The credit card 80 may be issued pursuant to an application that may be submitted by the user 80 and processed by the institution system 5, such as the application processor 42. At 420, a charge may be made on the credit card 80.

At 430, it may be determined if the charge meets predetermined criteria (e.g., amount of purchase, item(s) purchased, merchant 50 identifier, interest rate of the credit card 90, etc.). The predetermined criteria may have been previously provided by the user 90 and/or the institution system 5 and may be stored in storage of the institution system, such as in a database record associated with the user 90, the credit card 80, the merchant 50, or other data. The predetermined criteria may be generated using the rules described above or may be generated independently of the rules. Aspects of the charge may be compared to predetermined criteria that may be retrieved from storage at 430.

If the charge does not meet the predetermined criteria, then the charge remains on the credit card 80 at 490. Otherwise, if the charge does meet the predetermined criteria, at 440, it may be determined if the user 90 has a line of credit, such as the line of credit 83, with the institution 2. If the user 90 has a line of credit 83, at 445, the user 90 may be notified (e.g., by mail or electronically) and asked if they would like the charge transferred to the line of credit 83 (e.g., in a manner similar to operation 360 described with respect to the method 300). If the user would like to transfer the charge, the charge may be transferred to the line of credit 83 at 450. If not, the charge remains on the credit card 80 at 490.

If the user 90 does not have a line of credit 83 with the institution 2 as determined at 440, the institution 2 may determine if the user 90 is eligible for a line of credit 83, at 460. For example, the eligibility processor 32, described with respect to FIG. 1, may be used to determine if the user 90 is eligible for a line of credit 83. If the user 90 is eligible, the user 90 may be notified and offered the line of credit 83 at 465 along with an offer to transfer the credit card 80 charge to the line of credit 83. Any item may be used as collateral for an equity line of credit, such as a house, a vehicle, a boat, an airplane, or even the item that was purchased. It may be determined how large (i.e., a limit on) a line of credit the user 90 may open. The user 90 may open the line of credit 83 in any amount up to and including this limit. In an implementation, the user 90 may apply for the line of credit 83, may be approved, and the line of credit 83 may be opened for the user 90. In an implementation, the user 90 may be pre-approved for the line of credit 83 prior to being notified at 465.

The user 90 may accept the line of credit 83 at 470 and the charge may be transferred at 450. The charge transfer controller 46 of FIG. 1 may be involved in transferring the charge from the credit card 80 to the line of credit 83, in an implementation. If the user 90 is ineligible for a line of credit, the charge remains on the credit card 80 at 490.

In an implementation, after receiving the line of credit 83, the user 90 may authorize the institution 2 to associate the credit card 80 (or another credit card) with the line of credit 83 and to transfer future charges made to the credit card 80 to the line of credit 83, similar to that described above with respect to the methods 200 and 300. In an implementation, the user 90 may set rules regarding which charges to the credit card 80 are to be transferred to the line of credit 83. The rules may be directed to the amount of the charge, the date of the charge, the merchant associated with the charge, the item(s) purchased with the charge, etc.

Figure 5:
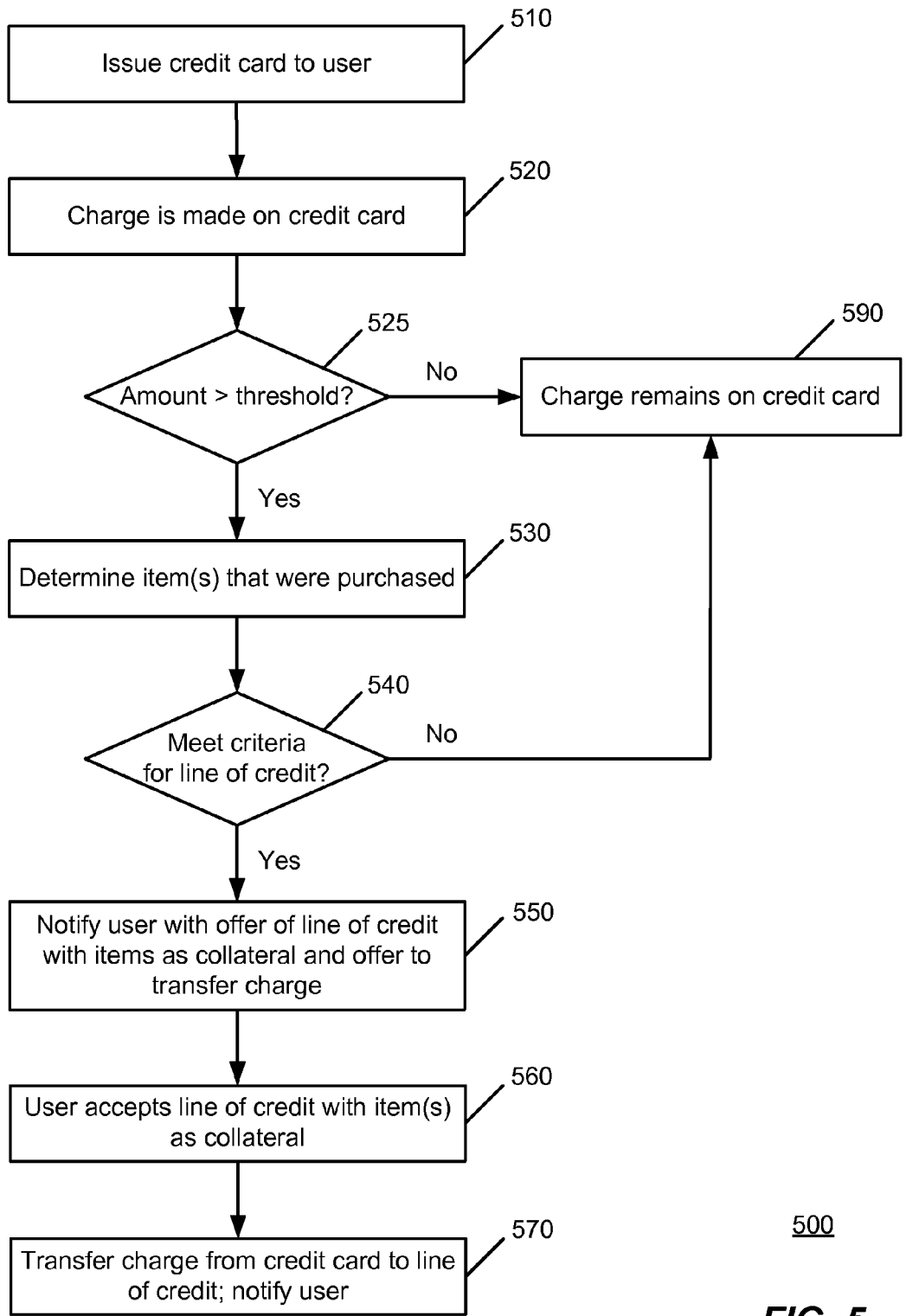
FIG. 5 is an operational flow of another implementation of a method that may be used to transfer a credit card charge to a line of credit.

FIG. 5 is an operational flow of another implementation of a method 500 that may be used to transfer a credit card charge to a line of credit. At 510 similar to 410, a user may be issued a credit card 80 from an institution. At 520 similar to 420, a charge may be made on the credit card 80.

In an implementation, at 525, it may be determined if the amount of the charge exceeds a predetermined threshold, such as $500, $1000, $5000, etc., for example. The institution system 5 may receive such charge information from the merchant 50, the credit card processor 52, or the receipt or credit card statement, for example. The threshold may be set by the institution system 5, in an implementation. If the amount of the charge does not exceed the predetermined threshold, then the charge may remain on the credit card 80 at 590.

If the amount of the charge exceeds the predetermined threshold, then at 530, the item(s) that were purchased may be determined, e.g., by asking the user 90, the merchant 50, and/or the credit card processor 52 for details of the transaction, or analyzing the credit card receipt or charge, for example. At 540, it may be determined if the item(s) meets predetermined criteria (e.g., is collateralizable, has resale value, etc.) by comparing the item(s) to a list of items stored in a database. The institution system 5 may generate and store the predetermined criteria in storage, such as information storage 22, user storage 24, or storage 8, for example, in an implementation. If the item(s) do not meet the predetermined criteria, then the charge may remain on the credit card 80 at 590.

Otherwise, if the item(s) meet the predetermined criteria, at 550, the institution 2 or the institution system 5 may offer an equity line of credit to the user 90 using the item(s) purchased as collateral, along with an offer to transfer the credit card 80 charge to the line of credit 83. Such offers may be made to the user 90 using any electronic or physical technique(s), such as via email, instant message, text message, a website, web chat, phone, facsimile, mail, and the like.

The user 90 may accept the line of credit 83 at 560, the line of credit 83 may be opened for the user (e.g., pursuant to the user's acceptance and/or an approval of an application received from the user 90), and the charge may be transferred at 570 from the credit card 80 to the line of credit 83. If the user does not want the line of credit 83, the charge remains on the credit card 80 (e.g., at 590).

Figure 6:
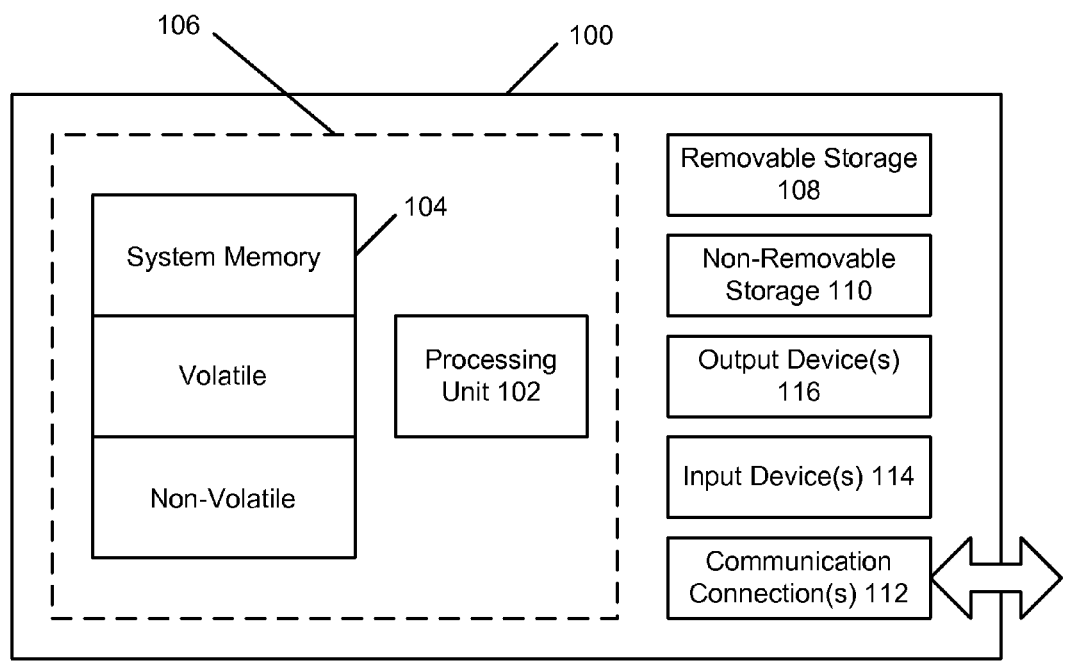
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as RAM), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for transferring a credit card charge to an equity line of credit, the system comprising:
    at least one subsystem that issues a credit card to a user;
    at least one subsystem that issues the equity line of credit to the user;
    at least one subsystem that receives a user-defined rule regarding whether the charge is to be transferred;
    at least one subsystem that receives an authorization from the user to transfer the charge prior to receiving the information regarding the charge on the credit card;
    at least one subsystem that receives information regarding a charge on the credit card; at least one subsystem that compares the information regarding the charge with the rule to determine whether the charge is to be transferred, and in response to determining that the charge is to be transferred, then transfers the charge from the credit card to the equity line of credit,
    wherein the rule uses at least one of: an amount of the charge, a merchant associated with the charge or an item associated with the charge, and
    wherein the equity line of credit uses the item associated with the charge on the credit card as collateral.

2. The system of claim 1, further comprising at least one subsystem that checks a balance on the credit card, and only if the credit card has a balance, then transfers the charge from the credit card to the equity line of credit.

3. A tangible computer-readable medium comprising computer-readable instructions for transferring a credit card charge to an equity line of credit, said computer-readable instructions comprising instructions that:
    issue a credit card to a user;
    receive information regarding a charge on the credit card;
    determine whether the charge meets a predetermined criteria;
    determine whether the user has been issued the equity line of credit;
    determine whether the user is eligible for the equity line of credit;
    notify the user regarding the equity line of credit when the user is eligible for the equity line of credit;
    issue the equity line of credit pursuant to receiving a request from the user for the equity line of credit; and
    transfer the charge from the credit card to the equity line of credit when the charge meets the predetermined criteria and the user has been issued the equity line of credit,
    wherein the predetermined criteria uses at least one of: an amount of the charge, a merchant associated with the charge or an item associated with the charge, and
    wherein the equity line of credit uses the item associated with the charge on the credit card as collateral.

4. The tangible computer-readable medium of claim 3, further comprising instructions that, if the charge meets the predetermined criteria and the user has been issued the line of credit, request an authorization from the user to transfer the charge and only transfer the charge after receiving the authorization from the user to transfer the charge.

5. The tangible computer-readable medium of claim 3, wherein transferring the charge from the credit card to the line of credit comprises using funds of the equity line of credit to pay the charge on the credit card.

6. The tangible computer-readable medium of claim 3, wherein the line of credit is a home equity line of credit.

7. The tangible computer-readable medium of claim 3, wherein if the user in ineligible for the equity line of credit, the charge remains on the credit card.

8. A system for transferring a credit card charge to a line of credit, the system comprising:
- at least one subsystem that issues a credit card to a user;
- at least one subsystem that receives information regarding a charge on the credit card;
- at least one subsystem that determines whether the user is eligible for an equity line of credit;
- at least one subsystem that issues the equity line of credit to the user when the user is eligible for the equity line of credit, wherein the at least one subsystem that issues the equity line of credit to the user when the user is eligible for the equity line of credit comprises at least one subsystem that notifies the user regarding the equity line of credit and issues the equity line of credit pursuant to receiving an acceptance from the user of an offer for the equity line of credit; and
- at least one subsystem that transfers the charge from the credit card to the equity line of credit, wherein the equity line of credit uses an item associated with the charge on the credit card as collateral,
- wherein the information regarding the charge on the credit card comprises an amount of the charge and an item purchased with the charge, and
- wherein determining whether the user is eligible, issuing the equity line of credit, and transferring the charge from the credit card to the equity line of credit are performed when the amount of the charge exceeds a predetermined threshold of the amount of the charge.

9. The system of claim 8, wherein the at least one subsystem that determines whether the user is eligible for the equity line of credit comprises at least one subsystem that determines whether an item associated with the charge on the credit card meets predetermined criteria to be used as collateral for the equity line of credit.

10. The system of claim 8, wherein the information regarding the item purchased with the charge is received from the user or a merchant associated with the charge.

11. The system of claim 8, wherein the charge remains on the credit card if the user is ineligible for the equity line of credit.

* * * * *